Sept. 23, 1930.  R. F. DOGE  1,776,491
RECEPTACLE FOR DISPATCHING DENTAL IMPRESSIONS
Filed July 27, 1929
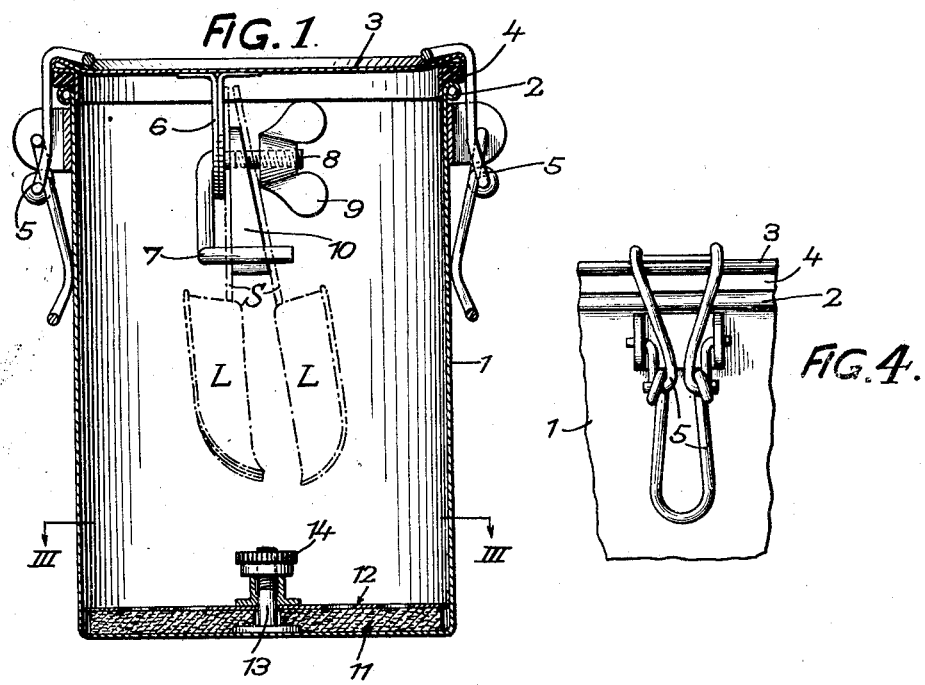
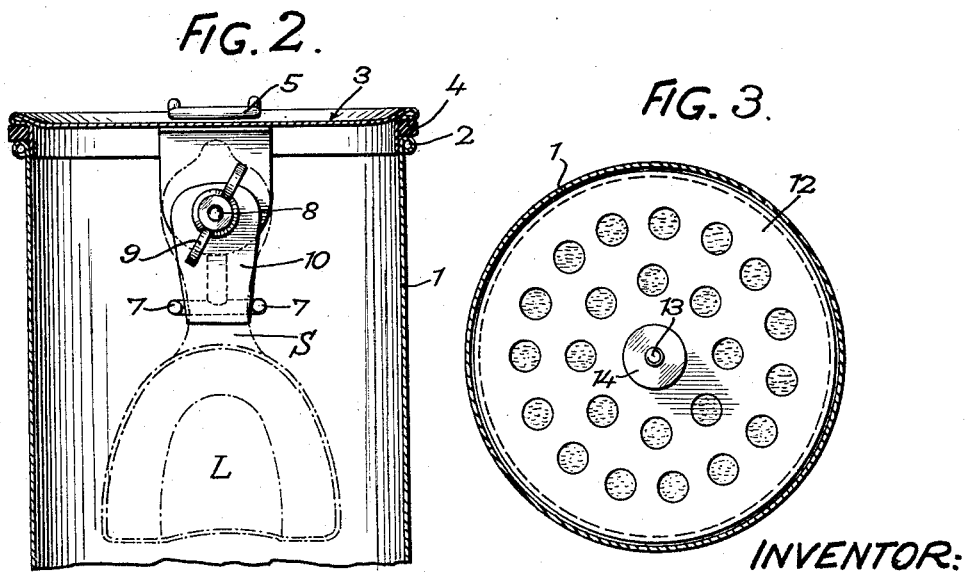
INVENTOR:
Robert F. Doge
by Kenny Orth
atty Patented Sept. 23, 1930

1,776,491

UNITED STATES PATENT OFFICE

ROBERT-FRANÇOIS DOGE, OF ZURICH, SWITZERLAND

RECEPTACLE FOR DISPATCHING DENTAL IMPRESSIONS

Application filed July 27, 1929. Serial No. 381,514.

The subject matter of the present invention is a receptacle for dispatching dental impressions made of a hydro-colloid moulding mass and its object is to prevent that the impressions get injured during storage or dispatch or are rendered unserviceable by the evaporation of the water contained in the moulding mass.

This object is attained with the subject matter of the present invention in that at the inner side of a cover placed on the receptacle and tightened against the latter a device for holding impression trays is provided; preferably means may be provided inside the receptacle to keep the interior in a moist condition.

To that purpose it is suitable to provide inside the receptacle a layer of a material to be soaked with water which continuously produces moisture inside the receptacle.

A constructional example of the subject matter of the present invention is illustrated on the accompanying drawings, in which Fig. 1 shows the receptacle in a vertical section, Fig. 2 shows a further vertical section through the upper part of the receptacle and taken at right angles to the section in Fig. 1, Fig. 3 is a horizontal section along line III—III in Fig. 1, and Fig. 4 shows on a larger scale a detail of the means for holding the cover.

1 denotes the cylindrical receptacle for dispatching purposes on the upper flange 2 of which a packing ring 4 of rubber is placed and a cover 3 is pressed on that ring 4. Diametrically opposite each other and laterally on the receptacle locking members 5 similar to those on beer bottles are provided which hold the cover on the receptacle. At the inner side of the cover a support 6 pointing in the downward direction and provided with a forked member 7 is arranged. Laterally on the support 6 a screw 8 having a wing nut 9 is fixed. The two impression trays L distanced from each other by an intermediate wedge body 10 are placed with their perforated handles S into the forked member 7 and thrust up to the support 6 on the screw 8 and pressed together by means of the wing nut 9 whereby the forked member 7 holds the handles and the wedge 10 fixed in the lateral direction.

On the floor of the receptacle a disk 11 of felt or the like is arranged and above the latter a perforated sheet metal disk 12 which is held in position by means of a screw 13 fixed to the floor and a nut 14. This disc of felt is soaked with water and maintains the necessary moisture inside the receptacle.

Instead of being of cylindrical shape the receptacle may be prismatic, for instance with a rectangular base and may be adapted to receive several pairs of impression trays.

I claim:

1. A receptacle for dispatching dental impressions made of a hydrocolloid moulding mass mounted on trays, comprising a receptacle, a cover tightly closing said receptacle, a support fixed to the inner side of said cover, screw means adapted to press the handles of the trays against said support, and a forked member adapted to embrace said handles and secure them in the lateral direction.

2. A receptacle for dispatching dental impressions made of a hydrocolloid moulding mass mounted on trays, comprising a receptacle, a cover tightly closing said receptacle, a support fixed to the inner side of said cover, screw means adapted to press the handles of the trays against said support, a wedge shaped member to distance the handles of the trays, and a forked member adapted to embrace said handles and secure them in the lateral direction.

In testimony whereof I have signed my name to this specification.

ROBERT-FRANÇOIS DOGE.